April 1, 1969          C. BRADFORD          3,436,015

MECHANICAL COMPUTER AND PLOT BOARD

Filed July 13, 1967          Sheet 1 of 2

*INVENTOR.*
CARSON BRADFORD
BY Pepper, Bain & Bain
ATTORNEYS

United States Patent Office 3,436,015
Patented Apr. 1, 1969

3,436,015
MECHANICAL COMPUTER AND PLOT BOARD
Carson Bradford, 455 Elizabeth Ave.,
Newark, N.J. 07112
Filed July 13, 1967, Ser. No. 653,084
Int. Cl. G06c 3/00
U.S. Cl. 235—86          9 Claims

ABSTRACT OF THE DISCLOSURE

My invention relates to mechanical computers generally and specifically to a mechanical computer which records and plots a plurality of individual data and totalizes the recorded data on a separate indicia.

Field of invention

Figure 1:

My invention relates to mechanical computers generally and specifically to a mechanical computer totalizer which does not depend upon interlocking gears as are commonly employed in the art today. Specifically, my computer is adapted to record and plot a plurality of individual data on a plurality of simulated, parallel bar graphs and to automatically totalize each recorded data on a separate totalizing bar graph of the same total length but calibrated to a different scale. In addition, the data is simultaneously plotted on permanent recording means.

Known computers of the mechanical totalizing type employ meshed gears which tend to jam or skip. In addition, such moving mechanical parts are subject to rust and corrosion rendering the device inoperable.

The mechanical principle upon which my computer functions is based upon a slip-belt technique whereby a continuous belt is loosely mounted between an axially rigid member and a rotatable member. The belt is just sufficiently loosely mounted around the rotatable member such that rotation of the rotatable member will not produce corresponding translational movement of the belt. However, if the belt is pulled along its longitudinal axis away from the rotatable member, sufficient frictional forces of engagement between the belt and the rotatable member will arise to cause the rotatable member to rotate in perfect registration with the belt.

At least one totalizer belt is also mounted on and between the axially rigid member and the rotatable member. However, the totalizer belt is sufficiently tightly engaged to the rotatable member to move translationally in perfect registration with rotation of the rotatable member. Thus, a plurality of belts may be slip-mounted over the rotatable member, each belt causing rotation of the rotatable member when it is mechanically translated but not producing translational movement of the other belts except for the totalizer belt which moves in response to rotation of the shaft in any direction. In this manner, each of the slip mounted belts may be manually moved a given distance to record certain data and the totalizer belt will keep a running total of the collective movement of each of the slip belts. Obviously, the diameter of the shaft upon which the totalizer belt is mounted may be reduced to change the calibration or scale for the totalizer belt.

In another species of my invention, I contemplate the use of meshed gears to drive a dial totalizer instead of the tightly engaged belt. The end of the shaft may be provided with either a worm or a bevel gear meshed respectively to a spur or second bevel bear driving a vertical shaft to which a pointer is affixed. This single gear is less subject to corrosion, slippage and the like than the multiple meshed gears of the usual pocket computer.

In addition, I contemplate providing a piece of paper beneath the belts upon which movement of each belt will be automatically plotted to produce a permanent record.

Therefore, it is among the objects and advantages of my invention to provide a mechanical computer which may record a plurality of individual data both by position of indicating means and by a permanent record and automatically totalize the recorded data.

Another object of my invention is to provide a mechanical computer in which individual data may be recorded and totalized without the use of meshed gears.

Yet another object of my invention is to provide a mechanical computer in which the recorded data appears as bar graphs which may be conveniently interrelated to fixed scales.

Still another object of my invention is to provide a mechanical computer having mechanical means for indicating changes in recorded data or totalized data.

Summary of invention

By way of summary, my invention is a mechanical computer and plotter comprising a rigid frame, a rotatable shaft mounted at one end of the frame, an axially rigid member mounted at the opposite end of the frame, generally parallel to the rotatable shaft, a plurality of continuous belts slip mounted over and extending between the rotatable shaft and the rigid member, a portion of each belt being exposed on at least one face of the rectangular frame, means on each belt for imparting translational movement thereto, each belt being sufficiently loosely mounted over the rotatable shaft so as to slip thereon when the shaft is rotated and to rotate the shaft when the belt is forcibly translated in the direction away from the shaft.

As an additional aspect of my invention, I contemplate a mechanical computer and plotter as aforesaid having a continuous belt mounted on and between the rotatable member and the rigid member which belt is engaged to the rotatable member to move in exact registration with the rotation thereof, the said belt functioning as a totalizer to totalize rotation of the rotatable member produced by the respective slip-mounted belts.

As a further aspect of invention, I contemplate a mechanical computer and plotter as aforesaid having a plot board being detachably mounted between the excursions of the belts upon which the movement of each belt is automatically and permanently recorded.

Preferred embodiment of invention

Figure 2:
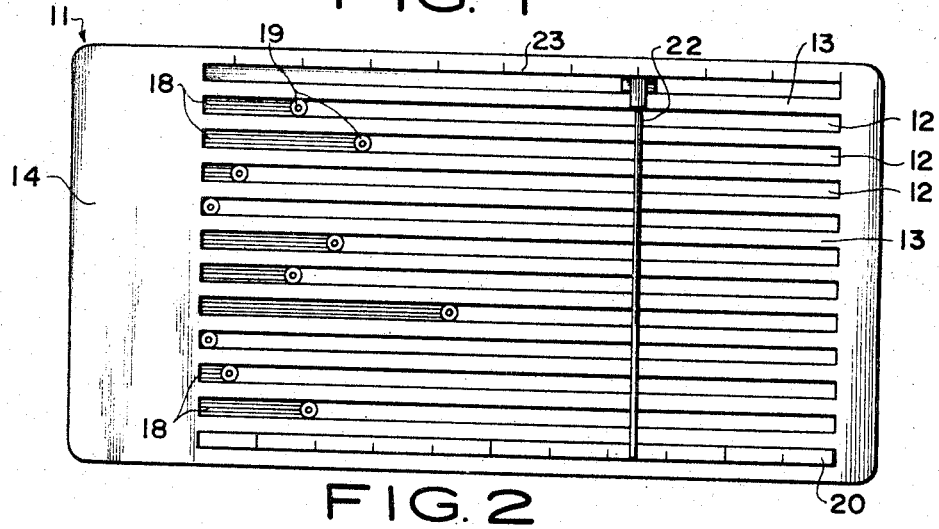
Figure 3:
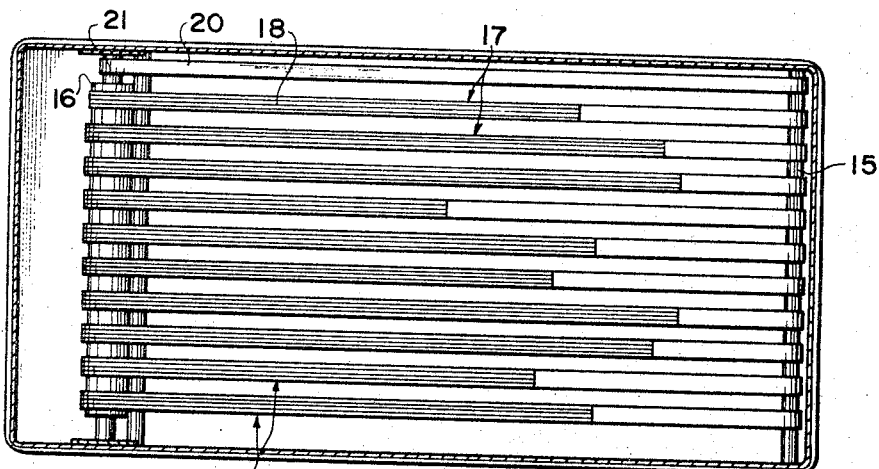
Figure 4:
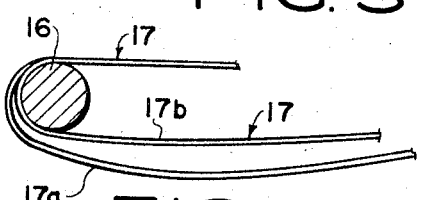
Figure 5:
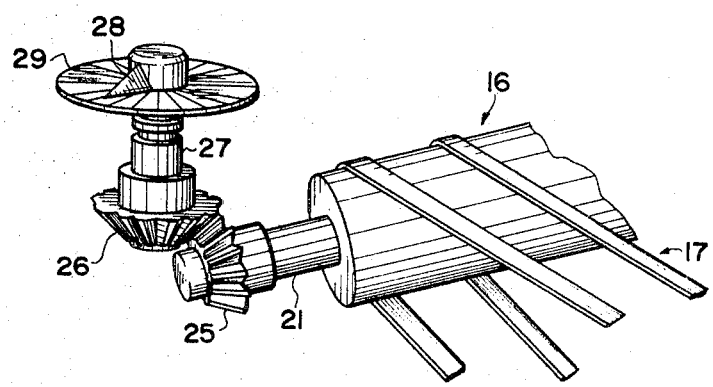
Figure 6:
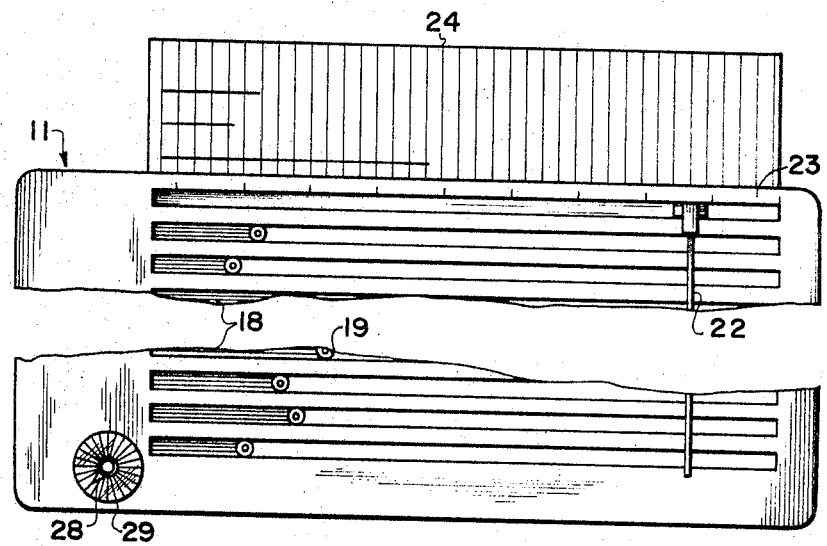

The objects and advantages aforesaid as well as other objects and advantages may be achieved by my mechanical computer one embodiment of which is illustrated in the drawings in which:

FIGURE 1 is a side elevational view of my computer;
FIGURE 2 is a top plan view thereof;
FIGURE 3 is a bottom plan view thereof;
FIGURE 4 is a side elevational cross-sectional partial view of a rotatable shaft and slip mounted belt in two positions.
FIGURE 5 is a partial, broken-away perspective view of one end of an alternative species of the rotatable shaft showing mechanical gearing to a totalizer dial;
FIGURE 6 is a partially broken-away top, plan view of a species of my computer showing a plot board slidably but detachably attached thereto.

Referring now to the drawings in detail, my mechanical computer comprises a generally rectangular rigid frame 11. The frame 11 defines a plurality of elongated, generally rectangular, open windows 12, 12 etc., spaced apart from each other by rib members 13, 13 etc., which for convenience may be an integral part of the frame 11. It should be noted, however, that the frame 11 may be provided with one large open window rather than sub-divided into separate windows.

At one end of the frame 11 there is provided a flat table portion 14 for the purposes of applying labels identifying the particular data recorded on the said belt, adjacent to the end of the respective windows 12, 12 etc.

An axially rigid member 15 is rigidly mounted beneath the bottom face of the frame 14 at one end thereof. For convenience, the member 15 may have a cylindrical form. Mounted beneath the face of the frame 11 at the opposite ends thereof is a rotatable shaft 16 which extends generally parallel to the member 15.

A number of continuous belts 17 are slip mounted over and extend between the rotatable member 16 and the rigid member 15. For convenience, a portion of each belt 17 equivalent to the longitudinal dimension of the window 12 may be distinctively marked as by a color or the like as indicated at 18. In addition, each of the belts 17 is provided with a stylus receptacle 19 to receive any pointed instrument to assist in translationally moving the belt 17 to the right or left.

The receptacle 19 may be provided with an opening to receive a pencil-lead or marking instrument which extends through the belt and engages a plot board or graph 24 slidably mounted between the excursions of each belt as is illustrated in greater detail in FIGURE 6.

A toalizer belt 20 is tightly mounted to a reduced portion 21 of shaft 16 at one end thereof. The reduced portion 21 may be provided with frictional material to insure precise movement of the belt 20 in registration with rotation of the reduced portion 21.

Each of the belts 17 are sufficiently loosely mounted over the rotatable shaft 16 such that rotation of the shaft 16 in and of itself will produce no translational movement of the respective belts 17. This loose, slip mounting of the belts 17 is illustrated in detail in FIGURES 1 and 4 wherein the belt denominated as 17a illustrates the loose or slip position.

When the belts 17 are forceably moved away from the rotatable shaft 16 by means of a stylus engaged with the receptacle 19, that belt 17 pulls tight against the rotatable shaft 16 as denominated by belt 17b. This tight engagement of the belt 17 with the shaft 16 insures intimate contact over a greater angular portion thereof and forces the rotatable shaft 16 to rotate in registration with the translational movement of the belt 17. Nevertheless, the remaining belts 17 which remain loosely mounted to the shaft 16 do not move in registration with the rotation of the shaft. Thus, the belts 17 are able to produce rotation of the shaft 16 but cannot themselves be translationally moved by rotation of the shaft 16 under normal operating conditions.

It may be easily seen, however, that the totalizer belt 20, which is tightly mounted at all times to the reduced portion 21 of shaft 16 moves in precise registration with rotation of the shaft 16. Thus, totalizer belt 20 records the sum total of the translational movement of each of the respective slip mounted belts 17. Of course, the diameter of the reduced portion 21 is less than the diameter of the shaft 16 so as to reduce its calibration or scale.

It should be noted that the rigid member 15 could be a non-rotatable shaft as shown in the drawings or a rotatable shaft functionally and structurally equivalent to the rotatable shaft 16.

An indicator 22 is slidably mounted at the top edge of the frame 11. The indicator 22 is perpendicular to the axis of the transport of the belts 17 and extends downwardly to and over the totalizer belt 20. The indicator 22 terminates at its top edge adjacent to the scale 23. The purpose of the said indicator is to provide in connection with scale 23 means for adding particular segments of each data to each belt by positioning the indicator along the scale 23 and moving the receptacle 19 to the edge thereof. The indicator also provides means for indicating specific changes in recorded data.

A second species of my invention is illustrated in FIGURE 5 wherein the shaft 16 is provided with a reduced portion 21 at one end thereof. A bevel gear 25 is positively affixed to the reduced portion 21 for rotation therewith. The bevel gear 25 is meshed with a second bevel gear 26 mounted to a shaft 27 which extends vertically, upwardly through the top of the frame. An indicator 28 is attached to the top end of the shaft 27 and indicates the total rotation of the shaft 16 on a dial 29 which may be either an integral part of the frame 11 or made as a separate disc. Obviously, any suitable gear arrangement may be substituted for gears 25 and 26 as for instance a worm and spur-gear combination.

In addition, I contemplate providing a plot board 24 which is slidably mounted between the excursions of each belt 17 and immediately beneath and adjacent to the top excursion thereof. The plot board 24 may have graph paper or any other suitable, detachable recording means attached thereto. In operation, a marker inserted through the receptacle 19 extends downwardly through the belt 17 and marks the paper on the plot board 24 as the stylus and guide 19 are transported. There is, thus, created a permanent bar graph record on the paper attached to the plot board 24. The plot board 24 may be slidably detached from the frame 11 and the graph paper removed therefrom to provide a permanent record of the data recorded thereon.

I claim:
1. A mechanical computer comprising,
 (a) a generally rectangular, rigid frame,
 (b) a rotatable shaft mounted at one end of the frame,
 (c) a fixed member mounted at the opposite end of the frame generally parallel to the rotatable shaft,
 (d) a plurality of continuous belts slip-mounted over and extending between the rotatable shaft and the fixed member,
 (e) a portion of each belt being exposed on at least one face of the rectangular frame,
 (f) means on each bolt for imparting translational movement thereto,
 (g) each belt rotating the rotatable shaft when the belt is translated away from the said rotatable shaft and,
 (h) the rotatable shaft being slip engaged to and being unable to translate each belt upon rotation of said shaft, and
 (i) means responsive to rotation of the shaft.
2. A mechanical computer comprising,
 (a) the structure in accordance with claim 1, in which,
 (b) each belt is sufficiently loosely mounted over the rotatable shaft so as to slip thereon when the shaft is rotated and to rotate the shaft when the belt ist ranslated in a direction away from the shaft.
3. A mechanical computer comprising,
 (a) the structure in accordance with claim 1 and,
 (b) said last named means comprising a totalizer belt tightly mounted over and extending between the rotatable shaft and the fixed member whereby rotation of the rotatable shaft causes translational movement of the totalizer belt in registration therewith.
4. A mechanical computer comprising,
 (a) the structure in accordance with claim 3, in which,
 (b) the rotatable shaft is provided with a portion having a reduced diameter and,
 (c) the totalizer belt is mounted on said reduced portion.
5. A mechanical computer comprising,
 (a) the structure in accordance with claim 3, and
 (b) an indicator slidably mounted to the frame extending across all said belts generally perpendicular thereto.
6. A mechanical computer comprising,
 (a) the structure in accordance with claim 1, and,
 (b) an indicator slidably mounted to the frame extending across said belts and generally perpendicular thereto.
7. A mechanical computer comprising,
 (a) the structure in accordance with claim 1, in which,
 (b) gear means attached to one end of the shaft, and,

(c) totalizer means operatively interconnected with said gear means for totalizing the rotation of said shaft.

8. A mechanical computer comprising,
(a) the structure in accordance with claim 1, and,
(b) gear means attached to the end of the shaft,
(c) second gear means operatively meshed with first said gear means and,
(d) totalizer means operatively connected to said second gear means.

9. A mechanical computer comprising,
(a) the structure in accordance with claim 1 and,
(b) a flat board detachably mounted between said continuous belts and,
(c) means provided in said means for moving said belt for marking said board through each of said belts in registration with translational movement thereof.

References Cited

UNITED STATES PATENTS

| | | | |
|---|---|---|---|
| 235,703 | 12/1880 | Richardson | 235—71 |
| 770,552 | 9/1904 | Bly | 235—71 |
| 773,675 | 11/1904 | Powell et al. | 235—71 |
| 2,097,835 | 11/1937 | Epps | 235—61 |
| 2,502,707 | 4/1950 | Correa | 116—135 |
| 2,629,184 | 2/1953 | Johnson | 35—24 |
| 2,649,790 | 8/1953 | Johnson | 35—24 |
| 2,703,548 | 3/1955 | Mackintosh | 116—135 |
| 3,281,071 | 10/1966 | Curran | 235—71 |

FOREIGN PATENTS

| | | |
|---|---|---|
| 198,977 | 8/1958 | Austria. |
| 728,060 | 4/1955 | Great Britain. |

OTHER REFERENCES

German Printed Application No. 1,070,859, Jahn, Dec. 10, 1959.

RICHARD B. WILKINSON, *Primary Examiner.*

S. A. WAL, *Assistant Examiner.*

U.S. Cl. X.R.

235—71; 116—135; 35—24